United States Patent [19]
Alvares et al.

[11] 3,991,020
[45] Nov. 9, 1976

[54] EXPANDABLE THERMOPLASTIC POLYMERIC COMPOSITIONS BASED ON STYRENE POLYMERS

[75] Inventors: Antonio Alvares; Gianfranco Biglione, both of Mantova, Italy

[73] Assignee: Montedison S.p.A., Milan, Italy

[22] Filed: May 20, 1974

[21] Appl. No.: 471,766

[30] Foreign Application Priority Data
May 21, 1973  Italy .................................. 24327/73

[52] U.S. Cl. ........................ 260/2.5 B; 260/2.5 HB; 260/874; 428/407
[51] Int. Cl.² ............................................. C08J 9/22
[58] Field of Search ............ 260/2.5 B, 2.5 HB, 874; 428/407

[56] References Cited
UNITED STATES PATENTS

| | | | |
|---|---|---|---|
| 3,468,820 | 9/1969 | Buchholz et al. | 260/2.5 B |
| 3,590,101 | 6/1971 | McTaggart et al. | 428/407 |
| 3,826,765 | 7/1974 | Altares | 260/2.5 B |

Primary Examiner—Wilbert J. Briggs, Sr.

[57] ABSTRACT

Expandable thermoplastic polymeric compositions based on styrene polymers and copolymers in the form of fine particles are disclosed. The particulate compositions essentially consist of (a) styrene polymers containing one or more expanding agents; (b) a polyether derived from propylene oxide and, optionally also from ethylene oxide, and containing polyhydroxy compounds, the polyether being homogeneously dispersed on the surface and preferably also within the expandable particles and (c) optionally, in combination with powdered inorganic and/or organic substances which are homogeneously dispersed on the surface of the polymer particles.

20 Claims, No Drawings

EXPANDABLE THERMOPLASTIC POLYMERIC COMPOSITIONS BASED ON STYRENE POLYMERS

THE PRIOR ART

It is known to obtain shaped bodies on expanded styrene polymers by molding, in closed (not gas tight) molds, fine particles of styrene polymers containing gaseous or liquid expanding agents, at temperatures exceeding the boiling point of the expanding agent and the softening point of the styrene polymer. Molded bodies of expanded styrene-based polymers having an apparent density even lower than 10 kg/cu.m. can be produced by said process.

According to a usual method, particles of the styrene-based polymer containing an expanding agent are first pre-expanded by means of steam in a closed or open vessel. Successively, the particles, pre-expanded to a predetermined apparent density, are further heated in a mold, which is not gas tight, to obtain a low-density shaped body or article.

The procedure is not completely free of drawbacks. In fact, the expandable particles tend to sinter even during the pre-expansion step, resulting in the formation of crumbs which reduce the degree of expansion that can be attained and seriously jeopardize both the subsequent molding in closed molds and the characteristics of the expanded product. Under such conditons, it is extremely difficult to fill the molds uniformly and it is practically impossible to obtain expanded molded articles.

THE PRESENT INVENTION

One object of this invention is to provide new expandable thermoplastic compositions based on styrene polymers which compositions do not have the drawbacks and disadvantages aforesaid, and which can be readily pre-expanded and then molded to obtain useful molded expanded bodies of high quality.

This and other objects are accomplished according to the invention which provides new expandable thermoplastic polymeric compositions in the form of fine powders and essentially consisting of:

a. 100 parts by weight of a styrene polymer, containing from 2 to 20, preferably from 3 to 10, parts by weight of one or more expanding agents and, in accordance with this invention, of b. 0.005 to 1.0 parts by weight of one or more polyethers derived from propylene oxide and/or propylene glycol and, optionally, also from ethylene oxide and/or ethylene glycol, and, optionally containing from 0.1% to 10% by weight of polyhydroxy compounds such as glycerol, hexane-triol, trymethylol-propane, sorbitol, alkylene glycols containing from 2 to 5 carbon atoms and the like, said polyethers being homogeneously dispersed on the surface, and preferably also inside, the expandable particles, optionally in combination with c. 0.01 to 1.0 part by weight of powdered inorganic substances such as talc, dolomite, silica and the like, and/or powdered organic substances such as waxes, surfactants, and metallic soaps, all these substances being homogeneously dispersed on the surface of the polymer particles.

Surprisingly, we have found that the expandable thermoplastic polymeric compositions according to this invention do not exhibit in practice any drawback due to the formation of crumbs during the pre-expansion step and, furthermore, with these compositions it is possible to obtain molded expanded bodies characterized by a short cooling time, a high sintering degree and thus a homogeneous structure having good mechanical properties and a high isolating power.

"Styrene-based polymers" as referred to herein include polystyrene and the copolymers of styrene with other vinyl and/or vinylidene monomers containing at least 50% by weight of chemically combined styrene. Specific examples of such co-monomers are alpha-methylstyrene, styrene halogenated in the nucleus, acrylonitrile, methacrylonitrile, esters of the acrylic and/or methacrylic acids with alcohols containing from 1 to 8 carbon atoms, N-vinyl compounds such as vinylcarbazole. The term "styrene-based polymers" as used herein includes, also, the copolymers of styrene with small amounts of monomers containing two double bonds, such as, for instance, divinylbenzene.

The expanding agents for the styrene-based polymers can be selected from a wide class of compounds, the characteristics of which are known in the art.

Particularly suitable expanding agents are the aliphatic hydrocarbons, either alone or in mixtures with each other, and containing from 2 to 6 carbon atoms, such as propane, butane, pentane, hexane, cyclohexane and the like, and the halogenated derivatives of aliphatic hydrocarbons containing from 1 to 3 carbon atoms, such as e.g., chlorofluorinated derivatives of methane, ethane and ethylene.

Besides the expanding agents, the expandable thermoplastic polymeric compositions according to this invention may contain adjuvants, such as, e.g., flame-extinguishing agents, organic and inorganic fillers, dyes, antistatic agents, plasticizers and other analogous compounds.

The fine particles of the styrene-based polymers may be in the form of small beads, granules or small scraps, generally obtaind by grinding styrene-based polymer blocks prepared by bulk polymerization.

The average diameters of these particles are comprised between 0.1 and 5 mm, preferably between 0.2 and 3 mm.

The fine particles of styrene-based polymers containing the expanding agent or agents may be prepared by conventional methods.

For example, finely subdivided expandable particles of styrene polymers may be prepared by polymerizing the monomers in an aqueous suspension, in the presence of expanding agents (fed at the beginning, during or at the end of polymerization), or by admixture of expanding agents to an aqueous suspension of finely subdivided particles of styrene-based polymers.

Polyethers to be employed according to the present invention may be selected from a wide range of products.

Best results are attained by using polyethers exclusively derived from propylene oxide (and/or glycol thereof) and, optionally, containing from 0.1% to 10% by weight of polyhydroxy compounds such as glycerol, sorbitol, hexane-triol, trimethylol-propane, alkylene glycols ($C_2 - C_5$) and the like or by using polyethers derived from propylene oxide and ethylene oxide (and/or glycols thereof) and containing from about 50% to about 99.5% by weight of propyleneoxide, from about 0.5% to less than 50% by weight of ethylene oxide and, optionally from 0.1% to 10% by weight of polyhydroxy compounds.

The admixture of polyethers to polystyrene is carried out by mixing the expandable polystyrene particles with the additive; alternatively, a portion of the additive may be incorporated in the polystyrene during polymerization, by suspending or dissolving polyether in the styrene monomer and/or in the expanding agent employed.

In both cases, the residence time in the mold, required to cool the shaped bodies obtained by molding the expandable particles so treated, is considerably shorter than is required to cool shaped bodies prepared starting from expandable particles which are not admixed with polyethers according to the invention.

Thereafter, the expandable particles admixed with the polyether in accordance with the present invention, may be treated with the powdered inorganic and/or organic substances of the type described hereinabove.

In the case of inorganic substances, it is preferable to use silica powder, with a particle size of about 20 m$\mu$.

In the case of organic matters, it is preferable to employ salts off calcium, strontium, barium, zinc, cadmium and the like of saturated or unsaturated fatty acids containing from 6 to 30 carbon atoms.

Best results are attained by using zinc stearate, barium and/or cadmium laurate, barium octanoate and the like.

The following examples are given as illustrative and are not intended as limiting.

able polystyrene particles having diameters comprised between 0.4 and 0.9 mm and between 0.9 and 1.6 mm.

The expandable particles contained about 6% by weight of expanding agent.

The expandable particles were admixed with the non-agglomerating agent in a SAGA screw-mixer, the mixing period for each additive being of about 5 minutes.

The particles so admixed with the anticaking agents were then fed to an ERLENBACH pre-expander of the continuous type, Mod. K2, in which they were pre-expanded by means of steam at 95°–100° C. Both density and percent of crumbs formed during pre-expansion were determined on the pre-expanded particles.

The pre-expanded particles of size varying from 0.9 to 1.6 mm were then allowed to age in air for 24 hours at room temperature.

The aged particles were introduced into a RAUSCHER blockmaking press until a mold having the following dimensions:

$$100 \times 100 \times 50 \text{ cm}$$

was filled. The molding of the block was carried out by means of steam at about 1 kg/sq.cm. gauge.

The characteristics of the thus prepared expanded particles and block are reported on the following Table I:

TABLE I

| | Size of the pre-expanded particles | | | | | |
|---|---|---|---|---|---|---|
| | from 0.4 to 0.9 mm | | | | from 0.9 to 1.6 mm | |
| Type and amount of non-agglomerating agent<br>Properties | No additive | Polyether (1) 0.12% | Polyether (1) 0.08% Zn stearate 0.04% | Polyethylene glycol (3) M.W. = 1000 0.12% | Polyether (2) 0.2% | Polyvinyl alcohol 0.01% Zn stearate 0.03% Silica 0.03% |
| Percent of crumbs during % pre-expansion (4) | 100 | none | none | 40 | — none | — none |
| Adhesion degree of the pre-expanded particles (5) | 3 | 0 | 0 | 2 | 0 | 0 |
| Density of the block kg/cu.m. | | | | | 20 | 20 |
| Sintering degree (6) | | | | | 70 | 70 |
| Cooling time in minutes (7) | | | | | 40 | 70 |

(1) Polyether containing about 80% by weight of propylene-oxide, about 18.5% of ethylene-oxide, about 1.5% of glycerol and having an average molecular weight around 5000.
(2) Polyether containing about 95% by weight of propylene-oxide, about 5% of glycerol, and having an average molecular weight around 2000.
(3) Employed in a 1:1 ethyl ether solution.
(4) The first value indicates the percent amount of crumbs of pre-expanded particles retained on a net having 0.5 cm free opening meshes.
(5) The adhesion degree is expressed by values ranging from 0 to 3, having the following meanings: 0 = the pre-expanded particles are arranged side by side, still without any adhesion; 1 = slight adhesion: the individual particles adhere to one another; in any case they separate from one another under a slight pressure. When such pre-expanded material is stirred in a vessel for a short time-period, no traces of adhesion remain; 2 = moderate adhesion: the crumbs can be still broken by hand; 3 = strong adhesion: the crumbs break with difficulty, with damage and deformation of the particles.
(6) This characteristic is evaluated on a 2 mm thick plate obtained from the central part of the block by hot-slinging, and is determined as percent of expanded particles which break when the plate is caused to break.
(7) Cooling time means the time required to cause the pressure inside the block to fall to zero, at the conclusion of the treatment with steam.

EXAMPLE I

A reactor suited to the polymerization in an aqueous suspension was fed with 100 parts by weight of styrene, 100 parts of deionized water, 0.05 parts of di-tert.butyl-peroxide, 0.15 parts of a suspending agent consisting of an acrylic acid-2-ethylhexylacrylate copolymer (ratio by weight = 89/11) and of 0.1 parts of NaCl.

The mixture was polymerized at temperatures ranging from 100° C to 140° C for a total time of 20 hours and then cooled down to room temperature.

8 parts of a liquid expanding agent consisting of a mixture of n-pentane and isopentane (70/30) were fed to the reactor during the polymerization.

The expandable polystyrene thus obtained was washed and dried at 35°–40° C for about 7 hours and then subjected to screening in order to obtain expand- Both shrinkage and sintering degree were determined 48 hours after molding.

From the data reported on Table I it is apparent that, using the non-agglomerating agents according to this invention, pre-expanded particles free from crumbs are obtained, and, contemporaneously, the cooling time of the shaped body in the mold is reduced. These two results are still more unexpected considering that agents such as polyethylene glycol, which is chemically very similar to the polyethers used in accordance with this invention give rise to the formation of 40% of crumbs during pre-expansion, and that non-agglomerating formulations of the known type (mixtures of polyvinyl alcohol with silica and Zn stearate), though avoiding the formation of crumbs during the pre-expansion step, require a long residence time of the shaped body in the mold before said body can be drawn out from the mold.

EXAMPLE II

Example I was repeated but using different non-agglomerating agents or mixtures thereof. The characteristics of the thus prepared expanded particles and the blocks obtained therefrom are reported on the following table II.

TABLE II

| ANTIAGGLOMERATING AGENT | | SIZE OF EXP.LE PARTICLES | PERCENTAGE OF CRUMBS | | COOLING Time minutes |
|---|---|---|---|---|---|
| TYPE | AMOUNT % b.w. | | a | b | |
| No. additive | — | 0.4–0.9 mm | 100 | — | — |
| Polyether (4) | 0.12 | 0.4–0.9 | none | — | — |
| Polyether (5) | 0.12 | 0.4–0.9 | none | — | — |
| Polyether (6) | 0.12 | 0.4–0.9 | none | — | — |
| Polyether (7) | 0.12 | 0.4–0.9 | none | — | — |
| Polyether (8) <br> Zn Stearate | 0.08 <br> 0.04 | 0.12 | 0.4–0.9 | none | — | — |
| Polyether (9) <br> Zn Stearate <br> Polyvinylalcohol <br> Zn Stearate <br> SiO$_2$ | 0.08 <br> 0.04 <br> 0.01 <br> 0.03 <br> 0.03 | 0.012 <br><br><br> 0.07 | 0.4–0.9 <br><br><br> 0.9–1.6 | none <br><br><br> — | — <br><br><br> none | — <br><br><br> 70 |
| Polyether (10) | 0.2 | 0.9–1.6 | — | none | 35 |
| Polyether (2) <br> Polyether (2)+SiO$_2$ (11) | 0.1 <br> 0.2 | 0.3 | 0.9–1.6 | — | none | 36 |
| Polyether (10) <br> Polyether (10)+SiO$_2$ (11) | 0.1 <br> 0.2 | 0.3 | 0.9–1.6 | — | none | 32 |
| Polyether (1) <br> Polyether (2)+SiO$_2$ (11) | 0.05 <br> 0.2 | 0.25 | 0.4–0.9 | none | — | — |
| Polyether (2) <br> Polyether (10)+SiO$_2$ (11) | 0.05 <br> 0.2 | 0.25 | 0.4–0.9 | none | — | — | a % amount of crumbs of preexpanded particles retained on a net having 0.5 cm free opening meshes
b % amount on a net having 1.5 cm free opening meshes
NOTES TO TABLE II
(1) See notes to table I
(2) See notes to table I
(4) Polyether derived from ethylene oxide and propylene oxide and containing about 90% by weight of this latter commercially known, with a molecular weight of polyoxypropylene hydrophobic base (PPO) of about 3150, as Pluronic L 101 (trade mark of Wyandotte Chem. Corp. USA).
(5) "Pluronic" L 62 containing about 20% by weight of ethylene oxide and about 80% by weight of propylene oxide (Mol. weight of PPO about 1750).
(6) "Pluronic" L 61 with the same composition of Pluronic L 101, but with a molecular weight of PPO of about 1750.
(7) "Pluronic" L 44 containing about 40% by weight of ethylene oxide and about 60% by weight of propylene oxide, with a molecular weight of PPO of about 1200.
(8) "Pluronic" L 92 containing about 20% by weight of ethylene oxide and about 80% by weight of propylene oxide, with a molecular weight of PPO of about 2750.
(9) Polyether containing about 2.5% of glycerol, about 12.5% of ethylene oxide and about 85% by weight of propylene oxide, with a molecular weight of about 3500.
(10) Polypropyleneglycol with a molecular weight of about 1000.
(11) Polyethers, before being added to polystyrene expandable particles are absorbed onto SiO$_2$ (34% by weight in respect to polyethers).

From the data of table II, it is clearly evident that a wide group of polyethers according to the present invention, when added to polystyrene expandable particles is actually capable to avoid or to reduce to a great extent the drawbacks due to the formation of crumbs during the preexpansion step; at the same time the cooling time of the blocks obtained therefrom is substantially reduced.

What we claim is:

1. Expandable thermoplastic polymeric compositions in the form of fine particles, characterized in essentially consisting of
   a. 100 parts by weight of styrene-based polymers containing from 2 to 20 parts by weight of at least one expanding agent; and
   b. 0.005 to 1.0 part by weight of (1) polyethers derived from at least one member of the group consisting of propylene oxide and propylene glycol; (2) mixtures of (1) with polyethers derived from at least one member of the group consisting of ethylene oxide and ethylene glycol; and (3) the polyethers of (1) or (2) containing from about 0.1 to about 10% by weight of polyhydroxy compounds, said polyethers being homogeneously dispersed on at least the surface of the expandable particles.

2. Compositions according to claim 1, in which the particulate styrene-based polymers contain from 3 to 10 parts by weight of at least one expanding agent.

3. Compositions according to claim 1, in which the polyhydroxy compounds present in the polyethers are selected from the group consisting of glycerol, hexanetriol, trimethylol propane, sorbitol and alkylene glycols containing from 2 to 5 carbon atoms.

4. Compositions according to claim 1, in which the polyethers are homogeneously dispersed both on the surface of, and interiorly of, the styrene-based polymeric particles comprising at least one expanding agent.

5. Compositions according to claim 1, also comprising from 0.01 to 1.0 part by weight of powdered inorganic and/or organic substances which are homogeneously dispersed on the surface of the expandable particles of the styrene-based polymers.

6. Compositions according to claim 5, in which powdered inorganic substances selected from the group consisting of talc, dolomite and silica are homogeneously dispersed on the surface of the expandable particles of the styrene-based polymers.

7. Compositions according to claim 5, in which powdered organic substances selected from the group consisting of waxes, surfactants and metallic soaps are homogeneously dispersed on the surface of the expandable particles of the styrene-based polymers.

8. Compositions according to claim 1, in which the polyethers are derived exclusively from propylene oxide.

9. Compositions according to claim 1, in which the polyethers contain from about 50% to about 99.5% by weight of propylene oxide and from about 0.5% to less than 50% by weight of ethylene oxide.

10. In a process for preparing expandable thermoplastic polymeric compositions based on styrene polymers and in which monomeric material selected from the group consisting of styrene and mixtures thereof with monomers copolymerizable therewith is polymerized in aqueous suspension, at least one expanding agent is admixed with the polymer formed during and/or at the end of the polymerization, and the polymer containing the expanding agent is separated from the polymerization medium in the form of fine expandable particles which are dried and screened, the improvement which consists in mixing said fine expandable particles with from 0.005% to 1% by weight of polyethers derived from propylene oxide, from propylene and ethylene oxides and glycols thereof, or from the glycols.

11. The process according to claim 10, in which the polyether is mixed with the expandable particles of the styrene-based polymers by simple mechanical mixing.

12. The process according to claim 10, in which a portion of the polyether is incorporated in the styrene-based polymers during the polymerization by dissolving or suspending the polyethers in the monomeric material and in the expanding agents, or in the expanding agents and the remaining portion of the polyether is then homogeneously dispersed on the surface of the expandable particles by simple mechanical mixing.

13. The process according to claim 10, in which the polyethers are derived exclusively from propylene oxide.

14. The process according to claim 10, in which the polyethers contain from about 50% to about 99.5% by weight of propylene oxide, and from about 0.5% to less than 50% by weight of ethylene oxide.

15. The process according to claim 10, in which the expandable particles mixed with the polyethers are further treated with powdered inorganic and organic substances, or with powdered organic substances in amounts of from about 0.01 to 1.0 part in percent by weight.

16. The process according to claim 10, in which the polyethers are further treated with a powdered inorganic substance selected from the group consisting of talc, silica and dolomite and a powdered organic substance selected from the group consisting of waxes, surfactants and metallic soaps, or with the organic substance.

17. Compositions according to claim 1, in which the polyethers contain from about 50% to about 99.5% by weight of propylene oxide, from about 0.5% to less than 50% by weight of ethylene oxide, and from about 0.1% to about 10% by weight of polyhydroxy compounds.

18. In a process for preparing expandable thermoplastic polymeric compositions based on styrene polymers and in which monomeric material selected from the group consisting of styrene and mixtures thereof with monomers copolymerizable therewith is polymerized in aqueous suspension, at least one expanding agent is admixed with the polymer formed during and/or at the end of the polymerization, and the polymer containing the expanding agent is separated from the polymerization medium in the form of fine expandable particles which are dried and screened, the improvement which consists in mixing said fine expandable particles with from 0.005% to 1% by weight of polyethers derived from propylene oxide, from propylene and ethylene oxides and glycols thereof, or from the glycols, said polyethers containing, also, from about 0.1% to about 10% by weight of polyhydroxy compounds.

19. The process according to claim 18, in which the polyethers are derived exclusively from propylene oxide and contain, also, from about 0.1% to about 10% by weight of the polyhydroxy compounds.

20. The process according to claim 18, in which the polyethers contain from about 50% to about 99.5% by weight of propylene oxide, from about 0.5% to less than 50% by weight of ethylene oxide, and from about 0.1% to about 10% by weight of the polyhydroxy coompounds.

* * * * *